(12) United States Patent
Jarvinen et al.

(10) Patent No.: US 11,089,405 B2
(45) Date of Patent: Aug. 10, 2021

(54) SPATIAL AUDIO SIGNALING FILTERING

(75) Inventors: Roope Olavi Jarvinen, Lempäälä (FI);
Kari Juhani Järvinen, Tampere (FI);
Juha Henrik Arrasvuori, Tampere
(FI); Miikka Vilermo, Siuro (FI)

(73) Assignee: NOKIA TECHNOLOGIES OY,
Espoo (FI)

( * ) Notice: Subject to any disclaimer, the term of this patent is extended or adjusted under 35 U.S.C. 154(b) by 0 days.

(21) Appl. No.: 14/383,492

(22) PCT Filed: Mar. 14, 2012

(86) PCT No.: PCT/IB2012/051206
§ 371 (c)(1),
(2), (4) Date: Sep. 5, 2014

(87) PCT Pub. No.: WO2013/136118
PCT Pub. Date: Sep. 19, 2013

(65) Prior Publication Data
US 2015/0039302 A1     Feb. 5, 2015

(51) Int. Cl.
*H04R 5/00*     (2006.01)
*G10L 15/14*    (2006.01)
*G06F 3/16*     (2006.01)
*G10L 17/18*    (2013.01)
*G10L 15/08*    (2006.01)
(Continued)

(52) U.S. Cl.
CPC .................. *H04R 5/00* (2013.01); *G06F 3/16*
(2013.01); *G06F 3/165* (2013.01); ***G10L
15/142* (2013.01); *G10L 17/18*** (2013.01);
*H04N 21/233* (2013.01); *H04R 27/00*
(2013.01); *G10L 2015/088* (2013.01); *H04R
2227/003* (2013.01); *H04R 2420/01* (2013.01);
*H04R 2430/01* (2013.01); *H04R 2499/11*
(2013.01); *H04S 1/007* (2013.01); *H04S 7/30*
(2013.01); *H04S 2400/13* (2013.01); *H04S
2420/01* (2013.01)

(58) Field of Classification Search
None
See application file for complete search history.

(56) References Cited

U.S. PATENT DOCUMENTS 5,910,996 A  6/1999 Eggers et al.
5,953,485 A  9/1999 Abecassis
(Continued)

FOREIGN PATENT DOCUMENTS

CN  1871856 A  11/2006
CN  101138275 A  3/2008
(Continued)

OTHER PUBLICATIONS

Eronen et al., "Audio-Based Context Recognition", IEEE Transactions on Audio, Speech, and Language Processing, vol. 14, Issue: 1, Jan. 2006, pp. 321-329.
(Continued)

*Primary Examiner* — Jonathan C Kim
(74) *Attorney, Agent, or Firm* — Alston & Bird LLP

(57) ABSTRACT

An apparatus comprising: an analyser configured to analyse at least one input to determine one or more expression within the at least one input; and a controller configured to control at least one audio signal associated with the at least one input dependent on the determination of the one or more expression.

22 Claims, 7 Drawing Sheets

(51) Int. Cl.
*H04R 27/00* (2006.01)
*H04N 21/233* (2011.01)
*H04S 1/00* (2006.01)
*H04S 7/00* (2006.01)

(56) References Cited

U.S. PATENT DOCUMENTS

| | | | |
|---|---|---|---|
| 6,011,851 | A | 1/2000 | Connor et al. |
| 6,011,854 | A | 1/2000 | Van Ryzin |
| 6,185,527 | B1* | 2/2001 | Petkovic ............... G06F 16/685 704/231 |
| 6,704,553 | B1 | 3/2004 | Eubanks |
| 7,020,292 | B1* | 3/2006 | Heubel ................. H03G 3/342 379/93.29 |
| 7,024,366 | B1 | 4/2006 | Deyoe et al. |
| 2001/0020837 | A1* | 9/2001 | Yamashita ......... G06K 9/00335 318/567 |
| 2002/0173283 | A1 | 11/2002 | Morewitz et al. |
| 2006/0074686 | A1 | 4/2006 | Vignoli |
| 2006/0095262 | A1* | 5/2006 | Danieli .................. G10L 15/08 704/251 |
| 2006/0259205 | A1* | 11/2006 | Krum ...................... G06F 3/014 701/1 |
| 2007/0083374 | A1 | 4/2007 | Bates et al. |
| 2007/0121530 | A1* | 5/2007 | Vadlakonda ............. H04N 7/15 370/260 |
| 2007/0253556 | A1* | 11/2007 | Nakao ................... H04M 19/04 381/2 |
| 2008/0103615 | A1 | 5/2008 | Walsh et al. |
| 2008/0137873 | A1* | 6/2008 | Goldstein ............ H04R 1/1016 381/57 |
| 2008/0170703 | A1* | 7/2008 | Zivney .............. H04M 1/72563 381/2 |
| 2009/0010456 | A1* | 1/2009 | Goldstein ........... G10L 21/0264 381/110 |
| 2010/0142715 | A1* | 6/2010 | Goldstein ........ G11B 20/10527 381/56 |
| 2010/0245624 | A1 | 9/2010 | Beaucoup |
| 2010/0250253 | A1* | 9/2010 | Shen ....................... G10L 13/00 704/260 |
| 2010/0303227 | A1* | 12/2010 | Gupta ................... H04M 1/247 379/266.06 |
| 2010/0316207 | A1* | 12/2010 | Brunson ................. H04M 3/56 379/202.01 |
| 2011/0054647 | A1* | 3/2011 | Chipchase ........ H04M 3/53366 700/94 |
| 2011/0276326 | A1* | 11/2011 | Fumarolo ............. H04M 3/527 704/235 |
| 2012/0072217 | A1* | 3/2012 | Bangalore ........... G10L 15/1807 704/243 |
| 2012/0203776 | A1* | 8/2012 | Nissan .................. G06F 16/685 707/728 |
| 2013/0050069 | A1 | 2/2013 | Ota |
| 2013/0238336 | A1* | 9/2013 | Sung ..................... G10L 15/005 704/255 |
| 2013/0290233 | A1* | 10/2013 | Ferren ..................... G06F 3/041 706/46 |
| 2014/0226842 | A1* | 8/2014 | Shenoy ................. H04N 7/147 381/303 |
| 2014/0348342 | A1* | 11/2014 | Laaksonen ............. H04R 3/005 381/92 |
| 2015/0039302 | A1* | 2/2015 | Jarvinen ................ H04R 27/00 704/232 |

FOREIGN PATENT DOCUMENTS

| | | |
|---|---|---|
| CN | 101584197 A | 11/2009 |
| CN | 101803336 A | 8/2010 |
| EP | 1868415 A1 | 12/2007 |
| EP | 2 455 841 A2 | 5/2012 |
| EP | 2 916 209 A1 | 9/2015 |
| WO | 9741683 | 11/1997 |
| WO | 2010111373 | 9/2010 |

OTHER PUBLICATIONS

International Search Report received for corresponding Patent Cooperation Treaty Application No. PCT/IB2012/051206, dated Mar. 4, 2013, 5 pages.

Extended European Search Report received for corresponding European Patent Application No. 12871453.2, dated Sep. 17, 2015, 6 pages.

Office action received for corresponding Chinese Patent Application No. 201280073149.1, dated Nov. 17, 2015, 9 pages of office action and no pages of office action translation available.

Office Action for European Application No. EP 12 871 453.2 dated May 31, 2016.

Office Action from corresponding Chinese Patent Application No. 201280073149.1 dated Dec. 13, 2016.

Office Action for corresponding Chinese Patent Application No. 201280073149.1 dated Jun. 7, 2017, with English translation, 16 pages.

Summons to Attend Oral Proceedings from European Patent Application No. 12871453.2 dated Apr. 19, 2017, 5 pages.

Summons to Attend Oral Proceedings from European Patent Application No. 12871453.2 dated May 19, 2017, 2 pages.

International Written Opinion received for International Application No. PCT/IB2012/051206, dated Mar. 4, 2013, 7 pages.

Office Action received for CN201280073149.1, dated Dec. 4, 2017 with English Translation, 15 pages.

Summons to Attend Oral Proceedings from European Patent Application No. 12871453.2 dated Nov. 14, 2017, 11 pages.

Office Action from corresponding Chinese Patent Application No. 201280073149.1 dated Apr. 13, 2018 with English Summary, 6 pages.

Office Action from corresponding European Patent Application No. 12871453.2 dated Apr. 19, 2018, 4 pages.

Office Action from corresponding Chinese Patent Application No. 201280073149.1 dated Oct. 26, 2018 with English Summary, 10 pages.

Extended European Search Report for Application No. EP 19164998.7 dated Jul. 17, 2017, 7 pages.

Intention to Grant for European Application No. 12 871 453.2 dated Jan. 7, 2019, 5 pages.

Intention to Grant for European Application No. 12 871 453.2 dated Jun. 17, 2019, 5 pages.

Office Action for Mexican Application No. MX/a/2016/011368 dated Aug. 14, 2019, 6 pages.

European Patent Office, Communication pursuant to Article 94(3) EPC for Application No. 19164998.7, dated Jun. 16, 2020, 4 pages, Germany.

National Intellectual Property Administration, PRC, Office Action received for Application No. 201280073149.1, dated Jun. 20, 2016, 17 pages, China.

National Intellectual Property Administration, PRC, Supplemental Search Report received for Application No. 201280073149.1, dated Apr. 22, 2016, 2 pages, China.

* cited by examiner

SPATIAL AUDIO SIGNALING FILTERING

RELATED APPLICATION

This application was originally filed as PCT Application No. PCT/IB2012/051206 filed Mar. 14, 2012.

FIELD

The present application relates to spatial audio signal processing, and in particular, but not exclusively to spatial audio signal processing for use in portable apparatus.

BACKGROUND

Modern electronic devices enable the user to consume multiple sources of audio and visual content at the same time. Mobile phones for example can be configured to record audio signals using the microphone, video images using the camera, receive real time audio signals and/or audio video streams via a wireless communications network, and replay or recover audio signals and/or audio visual data stored on the apparatus for example on a micro SD card or internal memory of the apparatus. Furthermore it is possible to consume (view/listen to) these multiple sources of audio and visual content at the same time and enable the user to switch or focus on one using the user interface. Thus for example a user can switch between a music MP3 audio stream stored on the apparatus and a streamed television programme received via the wireless network using the user interface to switch between the two sources.

SUMMARY

Embodiments attempt to address the above problem.

There is provided according to a first aspect a method comprising: analysing at least one input to determine one or more expression within the at least one input; and controlling at least one audio signal associated with the at least one input dependent on the determination of the one or more expression.

Controlling the at least one audio signal may comprise at least one of: volume processing the at least one audio signal associated with the at least one input dependent on the determination of the one or more expression; spatial processing the at least one audio signal associated with the at least one input dependent on the determination of the one or more expression; pausing the at least one audio signal associated with the at least one input dependent on the determination of the one or more expression; closing the at least one audio signal associated with the at least one input dependent on the determination of the one or more expression; and playing the at least one audio signal associated with the at least one input dependent on the determination of the one or more expression.

Spatial processing the at least one audio signal associated with the at least one input dependent on the determination of the one or more expression may comprise spatial processing to the foreground the at least one audio signal associated with the at least one input dependent on the determination of the one or more expression within the associated at least one input.

The method may further comprise spatial processing to the background at least one further audio signal dependent on the determination of the one or more expression within the associated at least one input.

Spatial processing the at least one audio signal associated with the at least one input dependent on the determination of the one or more expression may comprise: generating a head related transfer function associated with the at least one audio signal wherein the head related transfer function is dependent on determining the determination of the one or more expression within the associated at least one input; and applying the head related transfer function to the at least one audio signal associated with the at least one input.

Volume processing the at least one audio signal associated with the at least one input dependent on determination of the one or more expression may comprise volume processing to the foreground the at least one audio signal associated with the at least one input dependent on the determination of the one or more expression within the associated at least one input.

The method may further comprise volume processing to the background at least one further audio signal dependent on determining the determination of the one or more expression within the associated at least one input.

Volume processing the at least one audio signal associated with the at least one input dependent on the determination of the one or more expression may comprise: generating a volume level associated with the at least one audio signal wherein the volume level is dependent on determining the determination of the one or more expression within the associated at least one input; and applying the volume level to the at least one audio signal associated with the at least one input.

Analysing at least one input to determine the one or more expression within the at least input may comprise at least one of: audio signal analysing to determine an audio expression when the at least one input is an audio signal; text signal analysing to determine a text expression when the at least one input is a text input; data signal analysing to determine a data expression when the at least one input is a data input; image signal analysing to determine an image expression when the at least one input is an image input; and video signal analysing to determine a video expression when the at least one input is a video input.

Analysing at least one input to determine the one or more expression within the at least input comprises at least one of: hidden Markov model analysing; pattern detection analysing; dynamic time warping speech recognition analysing; neural network pattern recognition analysing; maximum entropy Markov model analysing; Bayesian network analysing; tonal analysing; and beat pattern analysing.

The method may further comprise selecting the one or more expression to be analysed for.

The method may further comprise generating the one or more expression to be analysed for.

Generating the one or more expression may comprise: selecting at least one input; selecting a portion of the at least one input; and generating the one or more expression dependent on the portion of the at least one input.

The at least one input may comprise at least one of: an audio signal; a text input; a data input; an image input; and a video input.

The method may further comprise receiving the at least one input from at least one of: a memory configured to store a pre-recorded or downloaded file; a transceiver; a receiver configured to receive a transmitted signal; at least one microphone configured to generate a signal based on a sound field surrounding an apparatus; and a sensor configured to generate a signal dependent on a characteristic of an apparatus.

The one or more expression may comprise at least one of: at least one phoneme; a defined musical note sequence; a defined image; an image component defined movement; a defined text expression; a defined data expression; a defined silence period; a defined click; a defined noise burst; and a defined hand clap.

The method may further comprise receiving at least two audio signals, wherein at least one of the at least two audio signals is the at least one input analysed to determine the expression within the at least one input.

The method may further comprise controlling the at least one audio signal, the at least one audio signal being independent of the at least one input, wherein the controlling is dependent on the determining the expression within the at least one input.

According to a second aspect there is provided an apparatus comprising at least one processor and at least one memory including computer code for one or more programs, the at least one memory and the computer code configured to with the at least one processor cause the apparatus to at least perform: analysing at least one input to determine one or more expression within the at least one input; and controlling at least one audio signal associated with the at least one input dependent on the determination of the one or more expression.

Controlling the at least one audio signal may cause the apparatus to perform at least one of: volume processing the at least one audio signal associated with the at least one input dependent on the determination of the one or more expression; spatial processing the at least one audio signal associated with the at least one input dependent on the determination of the one or more expression; pausing the at least one audio signal associated with the at least one input dependent on the determination of the one or more expression; closing the at least one audio signal associated with the at least one input dependent on the determination of the one or more expression; and playing the at least one audio signal associated with the at least one input dependent on the determination of the one or more expression.

Spatial processing the at least one audio signal associated with the at least one input dependent on the determination of the one or more expression may cause the apparatus to perform spatial processing to the foreground the at least one audio signal associated with the at least one input dependent on the determination of the one or more expression within the associated at least one input.

The apparatus may further perform spatial processing to the background at least one further audio signal dependent on the determination of the one or more expression within the associated at least one input.

Spatial processing the at least one audio signal associated with the at least one input dependent on the determination of the one or more expression may cause the apparatus to perform: generating a head related transfer function associated with the at least one audio signal wherein the head related transfer function is dependent on determining the determination of the one or more expression within the associated at least one input; and applying the head related transfer function to the at least one audio signal associated with the at least one input.

Volume processing the at least one audio signal associated with the at least one input dependent on determination of the one or more expression may cause the apparatus to perform volume processing to the foreground the at least one audio signal associated with the at least one input dependent on the determination of the one or more expression within the associated at least one input.

The apparatus may further be caused to perform volume processing to the background at least one further audio signal dependent on determining the determination of the one or more expression within the associated at least one input.

Volume processing the at least one audio signal associated with the at least one input dependent on the determination of the one or more expression may cause the apparatus to perform: generating a volume level associated with the at least one audio signal wherein the volume level is dependent on determining the determination of the one or more expression within the associated at least one input; and applying the volume level to the at least one audio signal associated with the at least one input.

Analysing at least one input to determine the one or more expression within the at least input may cause the apparatus to perform at least one of: audio signal analysing to determine an audio expression when the at least one input is an audio signal; text signal analysing to determine a text expression when the at least one input is a text input; data signal analysing to determine a data expression when the at least one input is a data input; image signal analysing to determine an image expression when the at least one input is an image input; and video signal analysing to determine a video expression when the at least one input is a video input.

Analysing at least one input to determine the one or more expression within the at least input may cause the apparatus to perform at least one of: hidden Markov model analysing; pattern detection analysing; dynamic time warping speech recognition analysing; neural network pattern recognition analysing; maximum entropy Markov model analysing; Bayesian network analysing; tonal analysing; and beat pattern analysing.

The apparatus may further perform selecting the one or more expression to be analysed for.

The apparatus may further perform generating the one or more expression to be analysed for.

Generating the one or more expression may cause the apparatus to perform: selecting at least one input; selecting a portion of the at least one input; and generating the one or more expression dependent on the portion of the at least one input.

The at least one input may comprise at least one of: an audio signal; a text input; a data input; an image input; and a video input.

The apparatus may further perform receiving the at least one input from at least one of: a memory configured to store a pre-recorded or downloaded file; a transceiver; a receiver configured to receive a transmitted signal; at least one microphone configured to generate a signal based on a sound field surrounding the apparatus; and a sensor configured to generate a signal dependent on a characteristic of an apparatus.

The one or more expression may comprise at least one of: at least one phoneme; a defined musical note sequence; a defined image; an image component defined movement; a defined text expression; a defined data expression; a defined silence period; a defined click; a defined noise burst; and a defined hand clap.

The apparatus may further perform receiving at least two audio signals, wherein at least one of the at least two audio signals is the at least one input analysed to determine the expression within the at least one input.

The apparatus may further perform controlling the at least one audio signal, the at least one audio signal being independent of the at least one input, wherein the controlling is dependent on the determining the expression within the at least one input.

According to a third aspect there is provided an apparatus comprising: means for analysing at least one input to determine one or more expression within the at least one input; and means for controlling at least one audio signal associated with the at least one input dependent on the determination of the one or more expression.

The means for controlling the at least one audio signal may comprise at least one of: means for volume processing the at least one audio signal associated with the at least one input dependent on the determination of the one or more expression; means for spatial processing the at least one audio signal associated with the at least one input dependent on the determination of the one or more expression; means for pausing the at least one audio signal associated with the at least one input dependent on the determination of the one or more expression; means for closing the at least one audio signal associated with the at least one input dependent on the determination of the one or more expression; and means for playing the at least one audio signal associated with the at least one input dependent on the determination of the one or more expression.

The means for spatial processing the at least one audio signal associated with the at least one input dependent on the determination of the one or more expression may comprises means for spatial processing to the foreground the at least one audio signal associated with the at least one input dependent on the determination of the one or more expression within the associated at least one input.

The apparatus may further comprise means for spatial processing to the background at least one further audio signal dependent on the determination of the one or more expression within the associated at least one input.

The means for spatial processing the at least one audio signal associated with the at least one input dependent on the determination of the one or more expression may comprise: means for generating a head related transfer function associated with the at least one audio signal wherein the head related transfer function is dependent on determining the determination of the one or more expression within the associated at least one input; and means for applying the head related transfer function to the at least one audio signal associated with the at least one input.

The means for volume processing the at least one audio signal associated with the at least one input dependent on determination of the one or more expression may comprise means for volume processing to the foreground the at least one audio signal associated with the at least one input dependent on the determination of the one or more expression within the associated at least one input.

The apparatus may comprise means for volume processing to the background at least one further audio signal dependent on determining the determination of the one or more expression within the associated at least one input.

The means for volume processing the at least one audio signal associated with the at least one input dependent on the determination of the one or more expression may comprise: means for generating a volume level associated with the at least one audio signal wherein the volume level is dependent on determining the determination of the one or more expression within the associated at least one input; and means for applying the volume level to the at least one audio signal associated with the at least one input.

The means for analysing at least one input to determine the one or more expression within the at least input may comprise at least one of: means for audio signal analysing to determine an audio expression when the at least one input is an audio signal; means for text signal analysing to determine a text expression when the at least one input is a text input; means for data signal analysing to determine a data expression when the at least one input is a data input; means for image signal analysing to determine an image expression when the at least one input is an image input; and means for video signal analysing to determine a video expression when the at least one input is a video input.

The means for analysing at least one input to determine the one or more expression within the at least input may comprise at least one of: means for hidden Markov model analysing; means for pattern detection analysing; means for dynamic time warping speech recognition analysing; means for neural network pattern recognition analysing; means for maximum entropy Markov model analysing; means for Bayesian network analysing; means for tonal analysing; and means for beat pattern analysing.

The apparatus may further comprise means for selecting the one or more expression to be analysed for.

The apparatus may further comprise means for generating the one or more expression to be analysed for.

The means for generating the one or more expression may comprise: means for selecting at least one input; means for selecting a portion of the at least one input; and means for generating the one or more expression dependent on the portion of the at least one input.

The at least one input may comprise at least one of: an audio signal; a text input; a data input; an image input; and a video input.

The apparatus may further comprise means for receiving the at least one input from at least one of: a memory configured to store a pre-recorded or downloaded file; a transceiver; a receiver configured to receive a transmitted signal; at least one microphone configured to generate a signal based on a sound field surrounding the apparatus; and a sensor configured to generate a signal dependent on a characteristic of an apparatus.

The one or more expression may comprise at least one of: at least one phoneme; a defined musical note sequence; a defined image; an image component defined movement; a defined text expression; a defined data expression; a defined silence period; a defined click; a defined noise burst; and a defined hand clap.

The apparatus may further comprise means for receiving at least two audio signals, wherein at least one of the at least two audio signals is the at least one input analysed to determine the expression within the at least one input.

The apparatus may further comprise means for controlling the at least one audio signal, the at least one audio signal being independent of the at least one input, wherein the means for controlling is dependent on the determining the expression within the at least one input.

According to a fourth aspect there is provided an apparatus comprising: an analyser configured to analyse at least one input to determine one or more expression within the at least one input; and a controller configured to control at least one audio signal associated with the at least one input dependent on the determination of the one or more expression.

The controller may comprise at least one of: a volume controller configured to volume process the at least one audio signal associated with the at least one input dependent on the determination of the one or more expression; a spatial controller configured to spatially process the at least one audio signal associated with the at least one input dependent on the determination of the one or more expression; a pause controller configured to pause the at least one audio signal associated with the at least one input dependent on the determination of the one or more expression; a close controller configured to close the at least one audio signal associated with the at least one input dependent on the determination of the one or more expression; and a play controller configured to play the at least one audio signal associated with the at least one input dependent on the determination of the one or more expression.

The spatial controller may be configured to spatial process to the foreground the at least one audio signal associated with the at least one input dependent on the determination of the one or more expression within the associated at least one input.

The spatial controller may be configured to spatial process to the background at least one further audio signal dependent on the determination of the one or more expression within the associated at least one input.

The spatial controller may comprise: a transfer function generator configured to generate a head related transfer function associated with the at least one audio signal wherein the head related transfer function is dependent on determining the determination of the one or more expression within the associated at least one input; and a function applier configured to apply the head related transfer function to the at least one audio signal associated with the at least one input.

The volume controller may be configured to volume process to the foreground the at least one audio signal associated with the at least one input dependent on the determination of the one or more expression within the associated at least one input.

The volume controller may be configured to volume process to the background at least one further audio signal dependent on determining the determination of the one or more expression within the associated at least one input.

The volume controller may comprise: a volume level generator configured to generate a volume level associated with the at least one audio signal wherein the volume level is dependent on determining the determination of the one or more expression within the associated at least one input; and an amplifier configure to apply the volume level to the at least one audio signal associated with the at least one input.

The analyser may comprise at least one of: an audio analyser configured to determine an audio expression when the at least one input is an audio signal; a text analyser configured to determine a text expression when the at least one input is a text input; a data analyser configured to determine a data expression when the at least one input is a data input; an image analyser configured to determine an image expression when the at least one input is an image input; and a video analyser configured to determine a video expression when the at least one input is a video input.

The analyser may comprise at least one of: a hidden Markov model analyser; a pattern detection analyser; a dynamic time warping speech recognition analyser; a neural network pattern recognition analyser; a maximum entropy Markov model analyser; a Bayesian network analyser; a tonal analyser; and a beat pattern analyser.

The apparatus may further comprise a controller configured to select the one or more expression to be analysed for.

The apparatus may further comprise a learning module configured to generate the one or more expression to be analysed for.

The learning module may comprise: a selector configured to select at least one input; a parser configured to select a portion of the at least one input; and generator configured to generate the one or more expression dependent on the portion of the at least one input.

The at least one input may comprise at least one of: an audio signal; a text input; a data input; an image input; and a video input.

The apparatus may further comprise an input receiver configured to receive the at least one input from at least one of: a memory configured to store a pre-recorded or downloaded file; a transceiver; a receiver configured to receive a transmitted signal; at least one microphone configured to generate a signal based on a sound field surrounding the apparatus; and a sensor configured to generate a signal dependent on a characteristic of an apparatus.

The one or more expression may comprise at least one of: at least one phoneme; a defined musical note sequence; a defined image; an image component defined movement; a defined text expression; a defined data expression; a defined silence period; a defined click; a defined noise burst; and a defined hand clap.

The apparatus may further be configured to receive at least two audio signals, wherein at least one of the at least two audio signals is the at least one input analysed to determine the expression within the at least one input.

The controller may be configured to control the at least one audio signal, the at least one audio signal being independent of the at least one input, wherein the controller is dependent on the determining the expression within the at least one input.

An electronic device may comprise apparatus as described above.

A chipset may comprise apparatus as described above.

BRIEF DESCRIPTION OF DRAWINGS

For better understanding of the present invention, reference will now be made by way of example to the accompanying drawings in which.

DESCRIPTION OF SOME EMBODIMENTS

Figure 1:
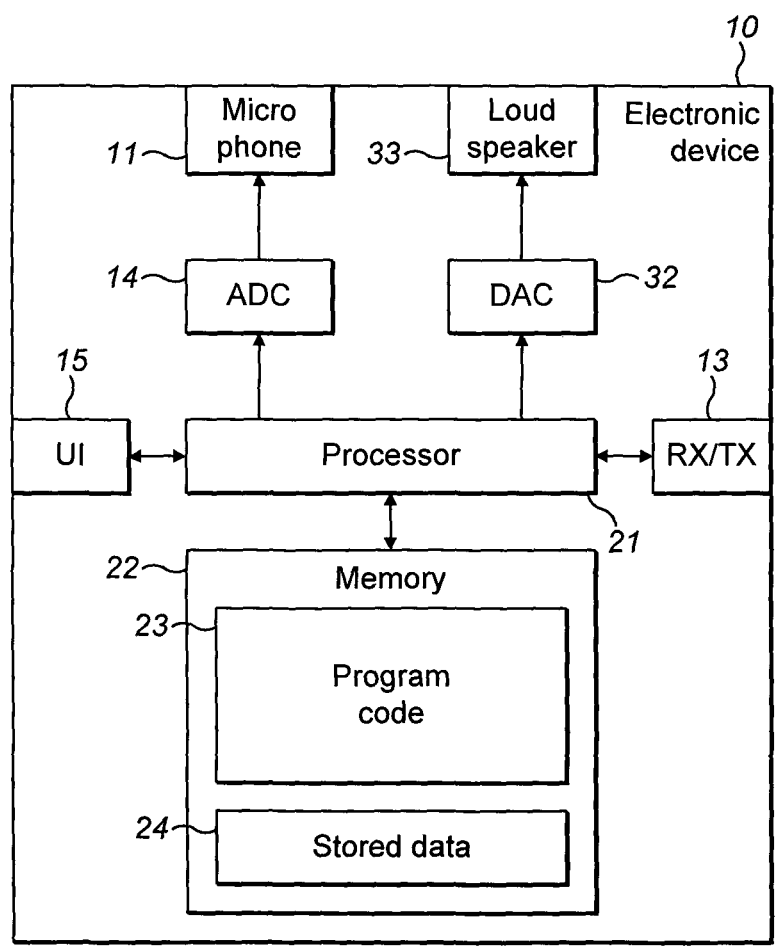
FIG. 1 shows schematically an electronic device employing some embodiments of the application.

The following describes possible spatial and volume audio signal processing for use in audio signal presentation or audio-visual signal presentation. In this regard reference is first made to FIG. 1 which shows a schematic block diagram of an exemplary electronic device or apparatus 10, which may incorporate a keyword or expression controlled audio signal processing apparatus according to an embodiment of the application.

The apparatus 10 may for example be a mobile terminal or user equipment of a wireless communication system. In other embodiments the apparatus 10 may be an audio-video device such as video camera, a Television (TV) receiver, audio recorder or audio player such as a mp3 recorder/player, a media recorder (also known as a mp4 recorder/player), or any computer suitable for the processing of audio signals.

The electronic device or apparatus 10 in some embodiments comprises a microphone 11, which is linked via an analogue-to-digital converter (ADC) 14 to a processor 21. The processor 21 is further linked via a digital-to-analogue (DAC) converter 32 to loudspeakers 33. The processor 21 is further linked to a transceiver (RX/TX) 13, to a user interface (UI) 15 and to a memory 22.

In some embodiments the apparatus comprises a processor 21. The processor 21 can in some embodiments be configured to execute various program codes. The implemented program codes in some embodiments comprise expression or keyword controlled audio signal processing code as described herein.

In some embodiments the apparatus comprises a memory or memories 22. The memory or memories 22 can in some embodiments comprise a data section 24 and a program code section 23. The implemented program codes can in some embodiments be stored for example in the memory 22 and specifically the program code section 23 for retrieval by the processor 21 whenever needed. The memory 22 data section 24 can be configured for storing data, for example data that has been processed in accordance with the application.

The expression controlled audio processing code in some embodiments can be implemented in hardware or firmware.

In some embodiments the apparatus comprises a user interface 15. The user interface 15 enables a user to input commands to the electronic device 10, for example via a keypad, and/or to obtain information from the electronic device 10, for example via a display. In some embodiments a touch screen may provide both input and output functions for the user interface.

The apparatus 10 in some embodiments comprises a transceiver 13 suitable for enabling communication with other apparatus, for example via a wireless communication network.

It is to be understood again that the structure of the apparatus 10 could be supplemented and varied in many ways.

The apparatus 10 for example can use the microphone 11 (which in some embodiments can be a microphone array) for inputting speech or other audio signals that are to be processed or are to be stored in the data section 24 of the memory 22.

The analogue-to-digital converter (ADC) 14 in some embodiments converts the input analogue audio signal into a digital audio signal and provides the digital audio signal to the processor 21. In some embodiments the microphone 11 can comprise an integrated microphone and ADC function and provide digital audio signals directly to the processor for processing.

The processor 21 in such embodiments then processes the digital audio signal according to the embodiments described herein.

The resulting processed audio bit stream can in some embodiments be output "live" or stored or "received" in the data section 24 of the memory 22, for instance for a later transmission or for a later presentation by the same apparatus 10.

The apparatus 10 in some embodiments can also receive further audio signal input or video signal inputs via the transceiver 13. In this example, the processor 21 can execute expression or keyword controlled audio signal processing program code stored in the memory 22. The processor 21 in such embodiments processes the received data according to some embodiments as described herein.

Furthermore in some embodiments the apparatus 10 can be configured to process audio signal or video signals retrieved or recovered from the memory 22, and specifically the data section 24 of the memory 22.

Furthermore the processor 21 in some embodiments can be configured to provide the processed audio signal output formed from processing (or mixing and spatialising) the audio signals received from external apparatus, the audio signals generate by the apparatus, and the audio signals recovered from memory to a digital-to-analogue converter 32. The digital-to-analogue converter 32 can be configured to convert the processed output audio signal into analogue audio data and can in some embodiments output the analogue audio via the loudspeakers 33. It would be understood that in some embodiments the loudspeakers can be replaced or implemented as earpieces, headphones, headsets or any suitable acoustic transducer configured to generate an acoustic waves.

Execution of the processing program code in some embodiments can be triggered by an application called by the user via the user interface 15.

In some embodiments the apparatus comprises a camera or video image capturing apparatus configured to capture video or image data which can be used as an input for the expression (keyword) controlled audio signal processor according to the embodiments as described herein.

Figure 2:
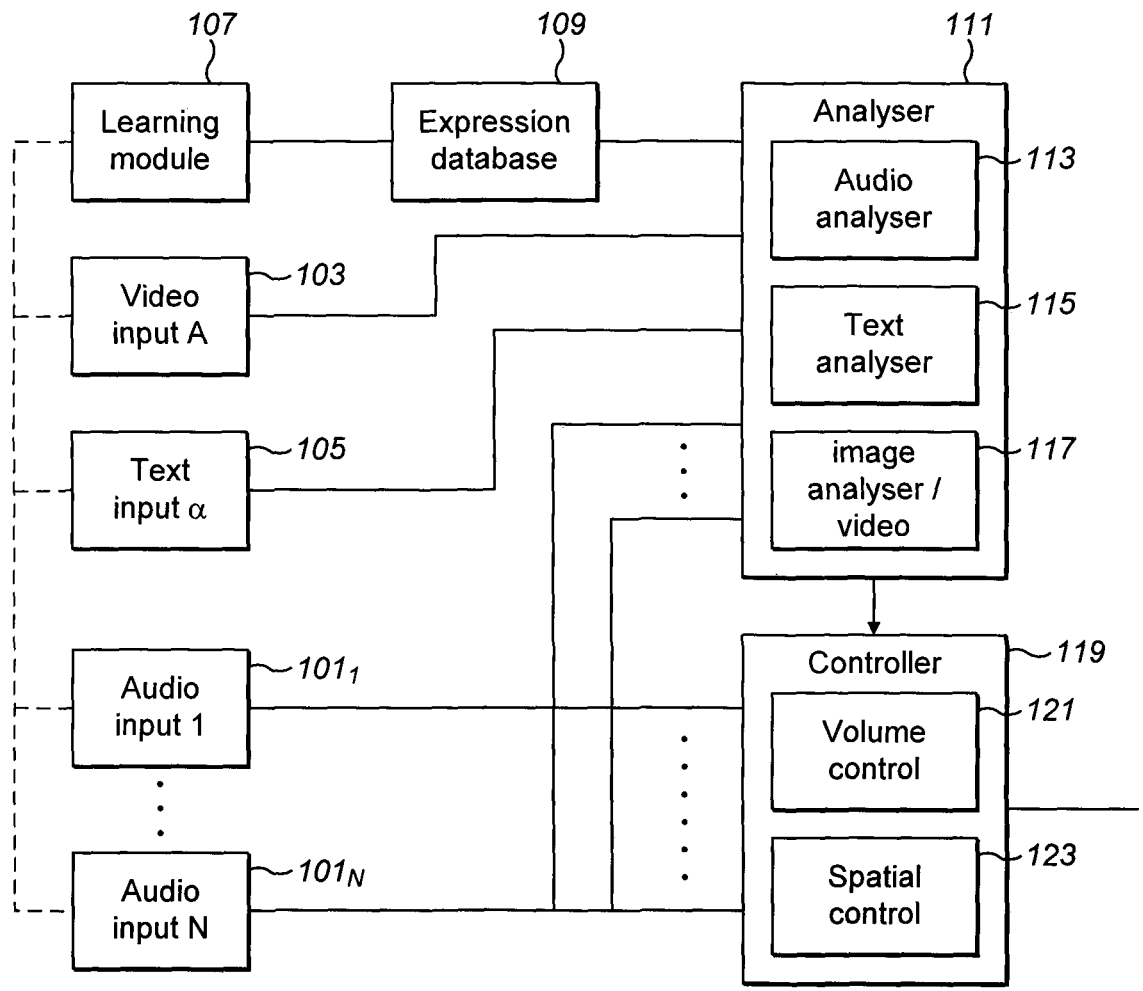
FIG. 2 shows schematically on example overview expression controlled audio signal processor according to some embodiments.
Figure 3:
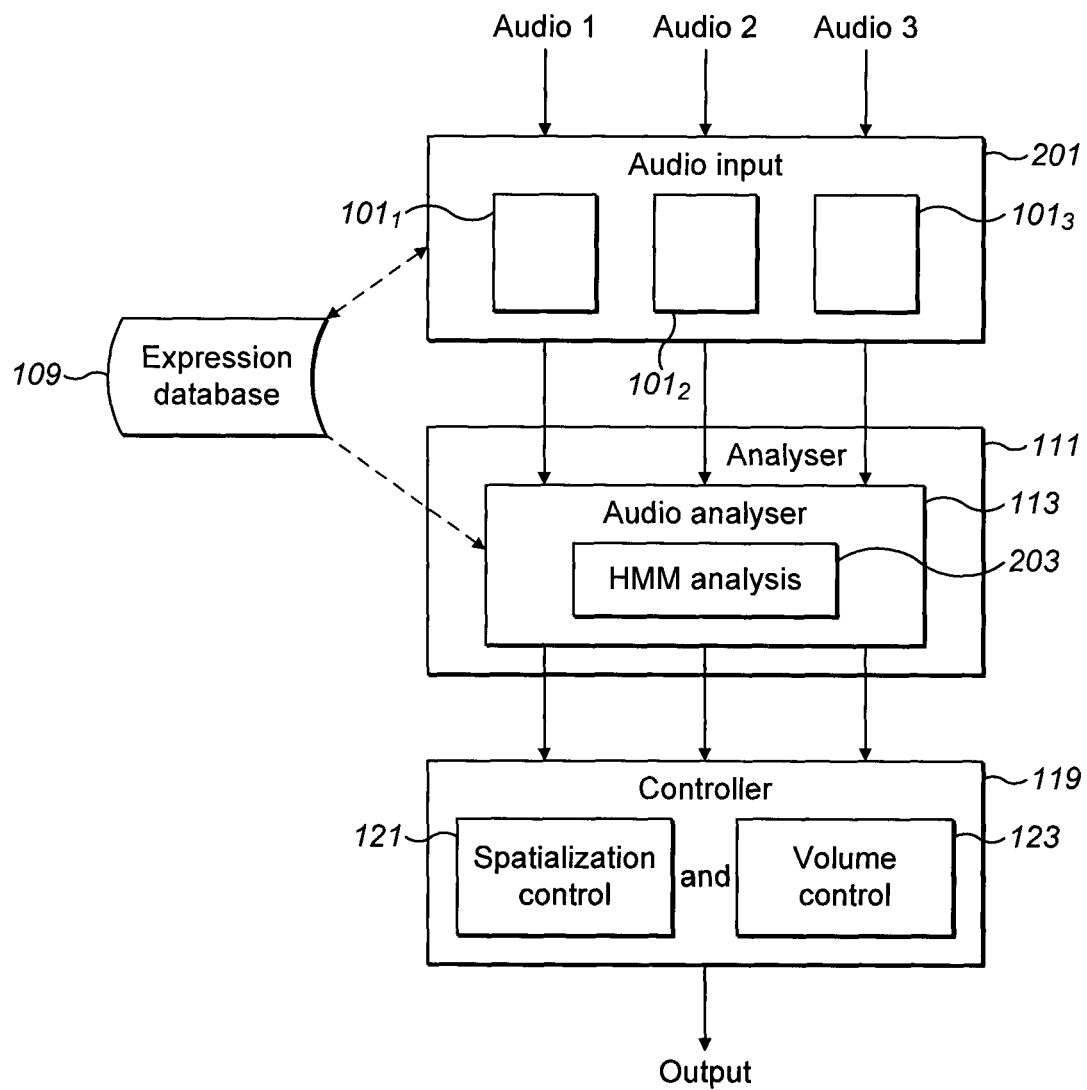
FIG. 3 shows schematically the expression controlled audio signal processing apparatus with respect to audio signal inputs according to some embodiments.
Figure 4:
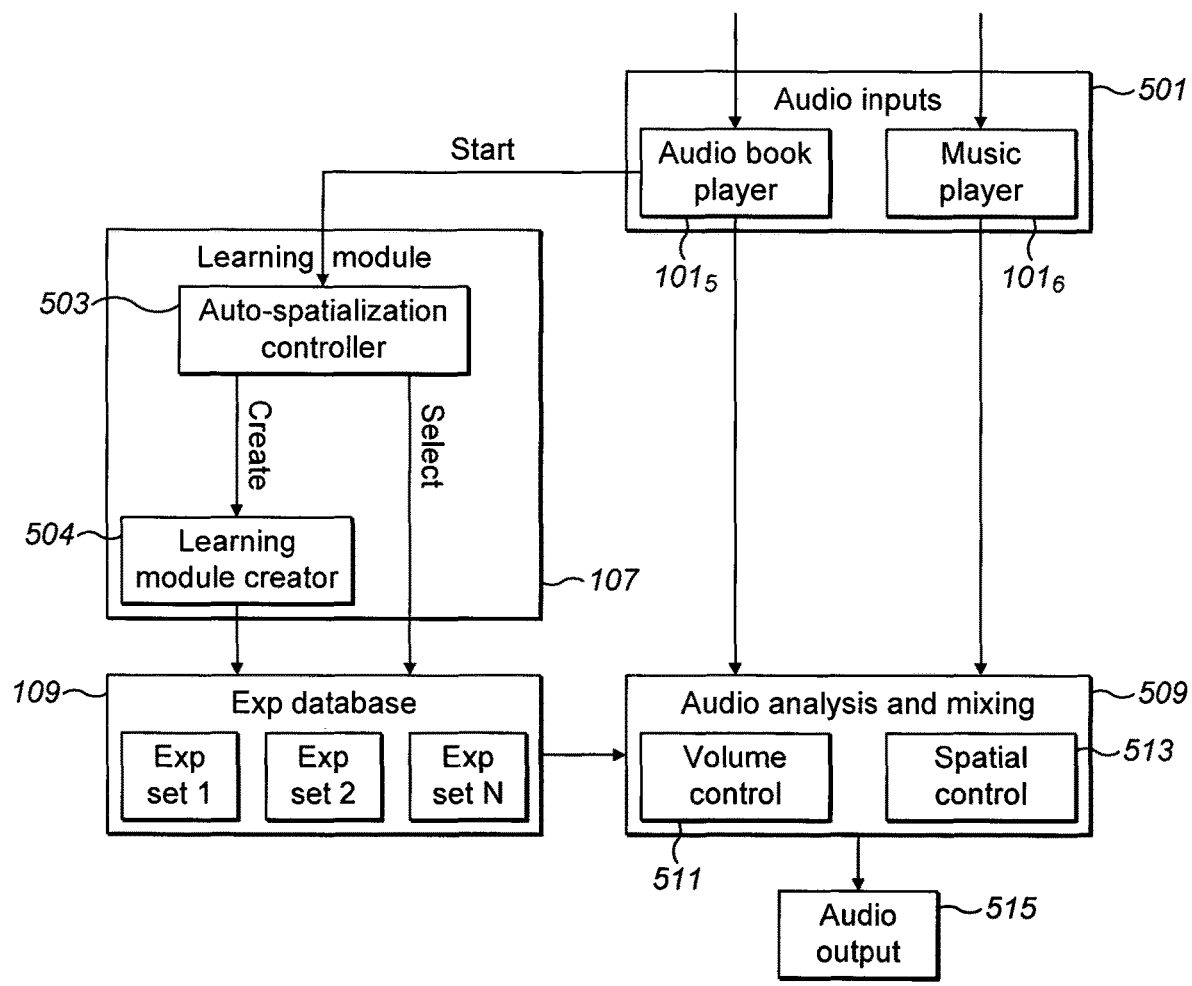
FIG. 4 shows schematically the expression controlled audio processing apparatus with respect to the learning module according to some embodiments.

It would be appreciated that the schematic structures described in FIGS. 2 and 4 and the method or operation steps shown in FIGS. 3, 5, 6 and 7 represent only a part of the operation of an apparatus and specifically expression or keyword controlled (spatial) audio signal processing apparatus or methods as exemplarily shown implemented in the apparatus shown in FIG. 1.

As discussed herein electronic devices or apparatus according to some embodiments can be configured to consume multiple sources of audio and/or audio-visual content at the same time and be configured to focus or display one on a switchable basis when something interesting occurs during one of the source inputs. Switching from one content source to another as discussed herein typically has required the user to interact with the apparatus. For example switching from a first content source such as a music (MP3) audio stream, to another content source such as a, TV programme requires the user to physically interact with the display.

This interaction with the user interface can be in some circumstances difficult or awkward, for example requiring the user to open or unlock the apparatus before switching sources. Furthermore in some circumstances switching source can be impossible or illegal for example attempting to switch sources while driving.

In embodiments as described herein the apparatus can be configured to control changing the volume of audio signals or signal processing such as spatialisation of the audio signals (or sources) depending on determining specific expressions, also called keywords or finger-prints, such as, 'audio expressions', or 'visual expressions' or 'text input expressions' in audio or visual sources.

For example in some embodiments the apparatus can be configured to retrieve from memory and output a music audio signal stream and a recorded news broadcast audio signal stream at the same time. In these embodiments the apparatus can initially be configured to process the audio signals such that the music audio signal is in the "foreground", in other words with a higher volume and spatially located to the front or side of the listener and the news broadcast audio signal is in the "background", in other words with a lower or softer volume and spatially located to the rear of the listener, furthermore the apparatus can be configured to determine when the news broadcast audio signal mentions a defined expression (keyword) for an interesting topic. The apparatus signal processing for the news broadcast audio signal having detected the expression or keyword can be configured to control an audio mixer such that the music audio signal is moved to the background, (volume and/or spatially) and the news broadcast audio signal is moved to the foreground (spatially and/or in volume). Furthermore although as described herein the controlling of the audio signal with respect to the detection of the expression from an input is an audio signal processing, such as spatial signal processing or volume signal processing, it would be understood that in some embodiments any suitable audio signal processing or audio control can be implemented dependent on determining the expression from or within the associated input. For example the control operations performed on the audio signals can be initialising or playing an audio signal, pausing an audio signal, switching between audio signals and stopping an audio signal.

As described herein in some embodiments the input can be a "live" audio signal source for example where the audio signal source input is captured from the location where the user is positioned. For example in some embodiments the microphone of the apparatus can generate the audio source signal. The apparatus in such embodiments can be configured to analyse the microphone audio signal and having determined a suitably defined keyword or audio 'finger-print' or expression to process the microphone audio signal to output the microphone audio signal as the foreground audio signal. For example where the apparatus is used in a lecture where multiple topics are on the agenda and the user is only interested in a single topic then the apparatus can be configured to output the microphone audio signal of the lecture in the background until the apparatus determines the expression (keyword) for the interesting topic and then mixes or processes the audio signal inputs to bring the microphone audio signal of the lecture to the foreground.

As discussed herein the expression (keyword) can in some embodiments be considered to be an 'audio finger-print' such as speech but can also be any other suitable feature parameter or characteristic capable of being identified in the audio signal. For example a radio or TV channel specific 'theme' or signature track can identify a TV or radio programme or a segment 'sound ident' can be identify a segment within a TV or radio programme. Furthermore the expression can be any selected or suitable non-speech signal such as a click, noise burst, hand clap and even the absence of audio content, for example a defined or pre-defined silence period.

Similarly in some embodiments the expression (keyword) can be considered to be a visual finger-print or text finger-print. In some embodiments the visual finger-print, text finger-print or audio finger-print can individually determine audio processor controls. However it would be understood that any suitable combination or sequence of defined expression or finger-prints in some embodiments can be used as a trigger to control audio operations, for example to identify on focus selection to a specific associated audio signal.

For example audio books including both audio and text versions of the book can be analysed and the analyser use the text data as a trigger for focus or spatialisation when a specific sentence or phrase in the book is reached. It would be understood as described herein that any combination of audio and text data as well as electronically converted formats such as 'text-to-speech' and 'speech-to-text' can be used as expression (keyword) or content analysis.

Similarly in some embodiments an input source can comprise visual media signals synchronised with an audio signal or associated with an audio signal. For example a video image of a news broadcast or slides from a meeting can be used as an auxiliary media source for expression or content analysis and expression or keyword detection. For example an expression or keyword could appear as text in the video image or as a specific image such as programme title sequence.

With respect to FIG. 2 an overview of an example audio signal processor incorporating spatialisation processing and volume control processing of audio sources signal based on expression (or finger-print) analysis is shown. In some embodiments the audio processor comprises at least 2 audio signal inputs. In FIG. 2 two audio signal inputs are shown, audio input 1 $101_1$ and audio input N $101_N$. It would be understood that the audio signal input can be any suitable audio signal. For example the audio signal input can be a memory retrieved or recovered audio signal. Examples of which can be recorded speech, music audio signals or similar. Furthermore in some embodiments the audio signal input can be a received audio input signal received by any suitable means, for example via a wireless, or wired coupling, or received such as an audio signal downloaded or streamed. In some embodiments the audio signal can be received via the transceiver or receiver. In some embodiments the audio signal input can be a generated audio signal for example from the microphone or microphone array or on internally generated audio signal such as an alert signal.

The audio input can be passed in some embodiments to the analyser 111 and to the audio mixer 119. Furthermore in some embodiments the audio input can be passed to the learning module 107.

In some embodiments the signal processing apparatus comprises at least one video signal input or video source. In the example shown in FIG. 2 a single video signal input is shown video input A 103, however it would understood that more than or fewer than one video signal input can be implemented in some embodiments. In the example shown in FIG. 2 the video input A 103 is coupled to the analyser 111 and in some embodiments to the learning module 107. It would be understood that in some embodiments the video signal input is associated with at least one audio signal input. For example in some embodiments the video input A 103 can be associated with the audio input 1 $101_1$ where the video input A is the video image generated by the apparatus camera and the audio input 1 $101_1$ the audio input generated by the microphone. Furthermore in some embodiments the separate video signal input and audio signal input can be received or recovered as combined audio-video input. For example in some embodiments the audio and video input can be the audio-video input for streamed or retrieved video programmes.

In some embodiments the apparatus comprises a text signal or data input. In the example shown in FIG. 2 there is a single text input, text input a 105. However it would be understood that in some embodiments there may be more than or fewer than one text input. In some embodiments the text or data input is associated with at least one of the audio inputs. The text input can in some embodiments be a real time captured text or data input, such as provided from a user interface, a received text or data input such as from a metadata stream associated with an audio stream, or a retrieved text input from memory associated with an audio signal input also retrieved from memory at the same time.

The text or data input can in some embodiments be configured to be passed to the learning module 107. Furthermore in some embodiments the text or data input can be passed to the analyser to be analysed to produce control data of signals for the audio mixer 119.

In some embodiments the apparatus comprises a learning module 107. The learning module can be configured to receive inputs from any of the audio, text or video inputs to identify any new expressions or keywords (audio, video or text fingerprints) which are to be stored on the expression database 109. The learning module furthermore in some embodiments can be configured to control the selection of "active" expressions (keywords) and/or sets of expressions (keywords) based on user interface inputs. The learning module 107 can be configured to be coupled to the expression database 109.

In some embodiments the apparatus comprises an expression (keyword) database 109. The expression (keyword) database 109 can be configured to receive inputs from the learning module 107 to add expressions or keywords (or video, text or audio fingerprints) to the expression (keyword) database 109. Furthermore the expression (keyword) database 109 can be configured to be coupled to the analyser 111. The analyser 111 can request from the expression (keyword) database 109 any suitable expression (keyword) suitable for being detected or searched for using the analyser and from the suitable audio, text or video signals input.

In some embodiments the apparatus comprises an analyser 111. The analyser is configured to receive a signal input such as an audio signal input, text signal input and video signal input and analyse these inputs to determine whether or not the input contains an expression or keyword (such as an audio fingerprint, text fingerprint or video fingerprint) and dependent on detecting such expressions or keywords control the controller (for example an audio mixer) 119 to generate a suitably mixed audio signal.

The analyser 111 in some embodiments comprises an audio analyser 113. The audio analyser 113 can be configured to receive at least one of the audio inputs and detect whether or not an expression or keyword (or audio fingerprint) is contained within the audio input and generate an audio mixer control for selecting at least one audio input on detecting the expression or keyword.

In some embodiments the analyser 111 comprises a text analyser 115. The text analyser is configured to receive at least one text data input and from the text data input determine whether or not the text or data contains a suitably selected expression or keyword (or text fingerprint). The text analyser 115 can then be configured on detecting a suitable expression or keyword in the text data input to generate a suitable control for the audio mixer to select the audio input associated with the text data input in the controller (e.g. audio mixer) 119.

In some embodiments the analyser 111 comprises an image/video analyser 117. The image/video analyser 117 is configured to receive at least one image and/or video input signals and determine whether the image/video input contain a suitable expression or keyword (or video fingerprint). On detecting a suitable video expression or keyword the image/video analyser 117 is configured to generate a suitable control signal for the controller (audio mixer) 119 to select an audio input associated with the video input.

In some embodiments the apparatus comprises a controller 119. In the following examples described herein the controller is an audio mixer 119. The audio mixer 119 is configured to receive control inputs from the analyser 111. Furthermore the audio mixer is configured to receive at least two audio inputs. In the example shown in FIG. 2 there are N inputs with audio input 1 $101_1$ and audio N $101_N$ shown explicitly. The audio mixer 119 is configured to mix the audio inputs such that a suitably mixed audio output stream reflects whether any of the audio inputs or associated video or text inputs contains suitable expressions or keywords. In other words the audio output is dependent on the determination of a suitable expression or keyword (whether the keyword is audio, text/data or image/video). In some embodiments an audio controller or suitable means for controlling the audio signals can be implemented to control the audio mixing and any other suitable audio control operation.

In some embodiments the controller 119 (audio mixer) comprises a volume control 121 configured to control the mixing levels between the audio inputs with respect to the audio output signal.

In some embodiments the controller 119 (audio mixer) comprises spatial control 123 configured to produce a spatially modified audio output from the audio input dependent on the output of the analyser 111.

It would be understood that in some embodiments the controller 119 can comprise any suitable audio input controller, for example a pause controller configured to pause (or temporarily halt the output of) an audio input, a play controller configured to play (or output) an audio input, and a stop controller configured to stop or halt the output of an audio input. It would be understood that in some embodiments the controller 119 can be configured to receive inputs other than audio inputs and control the output of these inputs dependent on the analysis and determination of a suitable expression.

With respect to FIG. 3 a processing apparatus according to some embodiments is shown with audio inputs only. The processor comprises a combined audio input 201 configured to receive or retrieve the audio source signal data. Furthermore with respect to FIG. 6 the operation of the audio input only processing apparatus as shown in FIG. 3 is shown.

As shown in FIG. 3 there are 3 audio streams forming 3 audio inputs. These are shown in FIG. 3 as: a first audio input $101_1$ configured to receive the first audio signal, Audio 1; a second audio input $101_2$ configured to receive the second audio signal, Audio 2; and a third audio input $101_3$ configured to receive the third audio signal, Audio 3. The audio inputs in some embodiments as shown in FIG. 3 are passed to the analyser 111.

Furthermore as shown in FIG. 3 the audio inputs can in some embodiments be coupled to the keyword database 109 with regards to selecting inputting or learning new expressions or keywords.

Figure 6:
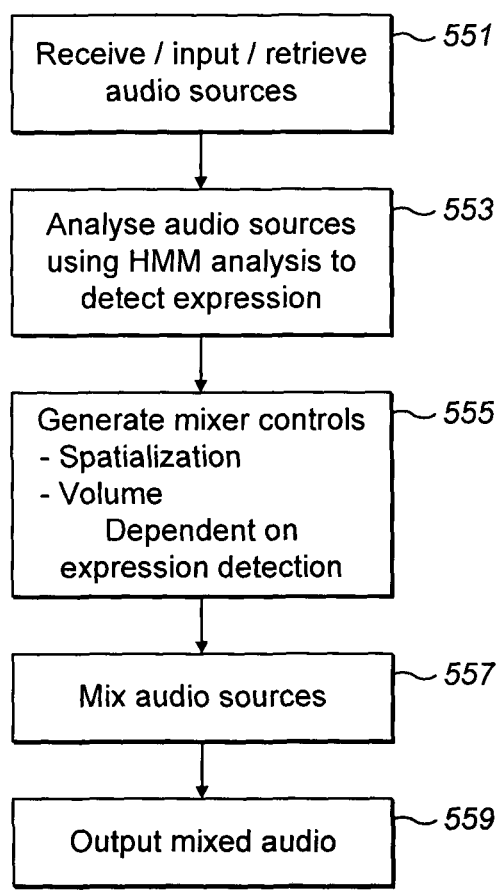
FIG. 6 shows schematically the operation of the expression controlled audio processing apparatus with respect to audio signal inputs as shown in FIG. 3 according to some embodiments.

The operation of receiving/inputting/retrieving audio sources is shown in FIG. 6 by step 551.

In some embodiments the processing apparatus comprises the analyser 111. The analyser 111 can comprise an audio analyser 113 configured to analyse the audio input signals. Furthermore the audio analyser 113 can in some embodiments be a Hidden Markov model (HMM) analyser 203. The Hidden Markov model analyser 203 can be configured to apply Hidden Markov model speech recognition to detect or calculate coefficients for short time windows using Fourier and cosine transformations and use statistical distribution estimation to determine or estimate phonemes within the audio signals. Furthermore the HMM analyser 203 can be configured to detect complex words containing phonemes in certain orders.

In some embodiments therefore the HMM analyser 203 can be configured to receive from the keyword database 109 at least one keyword to detect within at least one of the audio signal inputs. The keyword database 109 can therefore in some embodiments comprise a list of phonemes which are passed to the HMM analyser 203 for determining whether or not any of the audio streams contain the expression or keyword.

The operation of analysing the audio sources using HMM analysis to detect an expression is shown in FIG. 6 by step 553.

Although in this example a HMM speech recognition apparatus is used to detect an expression or keyword it would be understood that any suitable pattern detection or recognition apparatus can be used. For example dynamic time warping (DTW) speech recognition, neural network pattern recognition, maximum entropy Markov models (MEMM) or Bayesian network analysis can be used in some embodiments to detect speech phonemes. Furthermore any suitable tonal or beat pattern can in some embodiments be determined by the pattern recognition.

The analyser 111 can in some embodiments generate mixer controls which are dependent on the keyword detection. For example in some embodiments the analyser 111 can be configured to control the audio mixer so to bring the audio signal input stream where a keyword is detected to the "foreground" and move the other audio streams to the "background".

In the generation of mixer controls dependent on the expression detection is shown in FIG. 6 by step 555.

In some embodiments the processor comprises the controller in the form of an audio mixer 119. Furthermore in some embodiments the audio mixer comprises a spatialisation control 121 and volume control 123. The volume control 123 can be configured to receive each of the audio signal inputs to be output and control the volume of the audio signal inputs to be output so that when the analyser determines an expression or keyword in one of the audio inputs to be output a control signal is generated to control the volume control 123 to create the effect of the volume of the audio signal input having the expression or keyword is significantly greater than the volume of the other audio signal input bringing the audio signal input with the keyword to the "foreground" and the other audio signal inputs to the "background".

Furthermore in some embodiments where there is multiple channel audio signal output producing a spatial output effect, the spatial control 121 can be configured to mix the audio signal inputs to be output to produce an audio signal output wherein the audio signal input having the expression or keyword is spatially mixed or processed to be presented in front or in the "foreground" of the user whereas the other audio signal inputs are mixed or processed to be spatially in the background or behind the user. The spatialization control 121 can in some embodiments be realised by the application of a head related transfer function (HRTF) or similar impulse response or transfer function converting the audio signal inputs into a spatially located audio signal output.

The audio mixer 119 furthermore can be configured to mix the audio source audio signals to produce a single output.

The operation of mixing the processed audio sources is shown in FIG. 6 by step 557.

Furthermore the outputting of mixed audio signals is shown in FIG. 6 by step 559.

Figure 5:
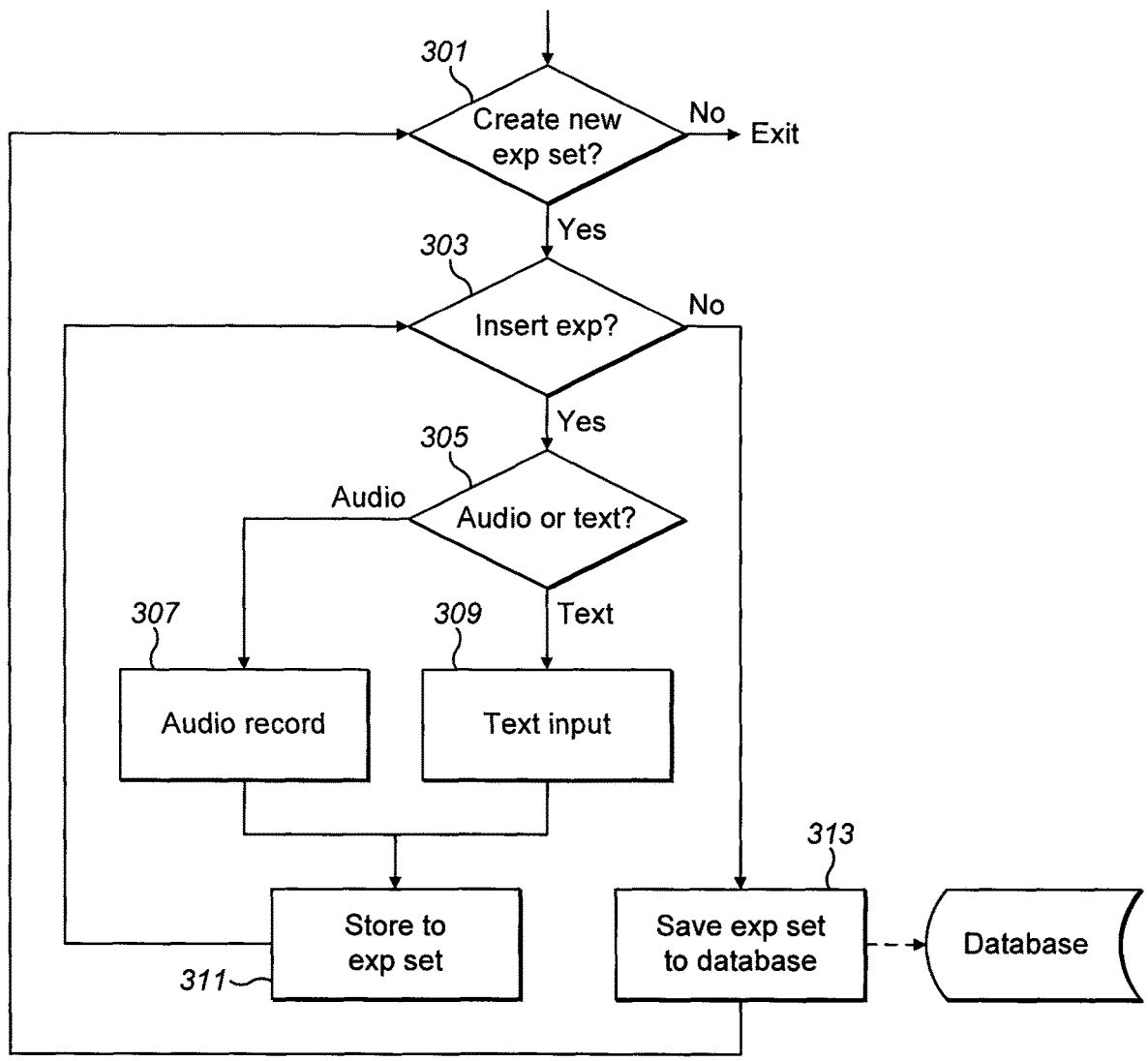
FIG. 5 shows schematically the operation of the learning module of the expression controlled audio processing apparatus according to some embodiments.

With respect to FIGS. 4 and 5 the processing apparatus and operation of the processing apparatus with respect to the learning module and expression database operations for audio and/or processing apparatus are shown in further detail and with respect to audio signal inputs. In the example shown in FIG. 4 the audio signal inputs 501 comprise an audio book player audio input $101_5$ and a music player audio input $101_6$. The audio book player audio input $101_5$, can in some embodiments be part of an audio book program or application (or app) operating or running on a processor of the apparatus. Similarly the music player audio input $101_6$ can in some embodiments be part of a music or audio player program or application also running on a processor of the apparatus.

In some embodiments the learning module 107 can comprise an auto spatialisation controller 503. The auto spatialisation controller 503 is configured to control the operation of the expression database 109. For example to control whether the expression database 109 is configured to receive, learn or create a new keyword (or expression) or to output or select a keyword (or expression) to be detected. In such embodiments the user can select an auto spatialisation feature of the audio book player application or program (or audio signal input) using the user interface of the apparatus and cause the apparatus to present the menu on the screen for creation of a new expression (set) or expression selection from an existing set. In some embodiments the expression sets can be stored externally to the apparatus, for example at a central location for storing expressions. In some embodiments the apparatus can permit a user to provide a defined label or name and more detailed information about each keyword set for easier identification. For example a first expression set can be "TV audio" for identifying, expressions from television programmes another "lecture" for identifying expressions during the lecture etc. Furthermore the user can choose to create a new set of keywords or expressions.

In some embodiments the auto spatialisation controller 505 can be configured to pass the selection information to the expression database to be passed to the analyser.

The auto spatialisation controller 503 thus in some embodiments receives the user interface input and can be coupled to expression database for selecting a specific expression or expression set.

In some embodiments the learning module comprises the learning module creator 504. The learning module creator 504 can be configured to receive an indicator from the auto spatialisation controller 503 that a new expression or expression set is to be created. In some embodiments the expression module 107 and in particular the expression module creator 504 can then be configured to receive new expression. In some embodiments the new expression can be determined by recording them into the apparatus microphone where in some embodiments the learning module creator 504 generates a suitable format signal to be stored in the expression database 109. In some embodiments the learning module creator 504 can be configured to receive text or data representations of the expressions to be created which cause the learning module creator 504 to generate a suitable format signal in the expression database 109. The expression database 109 can then receive the suitably formatted expressions.

With respect to FIG. 5 the operation of the learning module creator 504 with respect to an example new expression creation is shown.

The learning module creator 504 can in some embodiments be configured to determine whether there is an input to create a new expression set. Where no new expression set is required then the operation of the learning module creator 504 can end.

The operation of checking of the creation of a new expression set is shown in FIG. 5 by step 301.

Where a new expression set is required then the learning module creator 504 can in some embodiments determine whether a new expression is required in the set.

The operation of detecting whether a new expression is needed to be inserted is shown in FIG. 5 by step 303.

Where the learning module creator 504 determines that no new expression for the expression set is required then the learning module creator 504 can save the new expression set to the database, and then perform a create new expression set check shown in step 301.

The operation of saving the expression set to the database is shown in FIG. 5 by step 313.

Where the learning module creator 504 determines a new expression in the expression set is required then the learning module creator 504 can be configured to determine whether or not the expression is to be an audio or text expression.

The operation of detecting whether the new expression is audio or text is shown in FIG. 5 by step 305.

Where the new expression is text then the learning module creator 504 can be configured to receive a text input, and process the text input to generate a suitable format expression for the expression database 109.

The operation of receiving a text input is shown in FIG. 5 by step 309.

Where the new expression is an audio expression then the learning module creator can be configured to receive an audio signal, and process the audio signal input to generate a suitable format expression for the expression database 109.

The operation of receiving the audio signal is shown in FIG. 5 by step 307.

Following the receiving of the audio or text input then the learning module creator 504 can be configured to store the new expression to the expression set and perform another check of whether a new expression is to be inserted as part of the set, in other words to pass back to step 303.

The operation of storing the new expression to the expression set is shown in FIG. 5 by step 311.

In FIG. 4 the expression database 109 comprises multiple expression sets shown expression set 1; expression set 2; and expression set N. The output of the expression database 109 can then be passed to the combined audio analysis and mixing part shown in FIG. 4 as part of 509. The audio analysis and mixing part 509 can comprise the spatialisation control 121 and volume control 123 as show in FIG. 3, and be further configured to output the audio to a particular audio output such as an earphones, ear set, loudspeakers etc.

Figure 7:
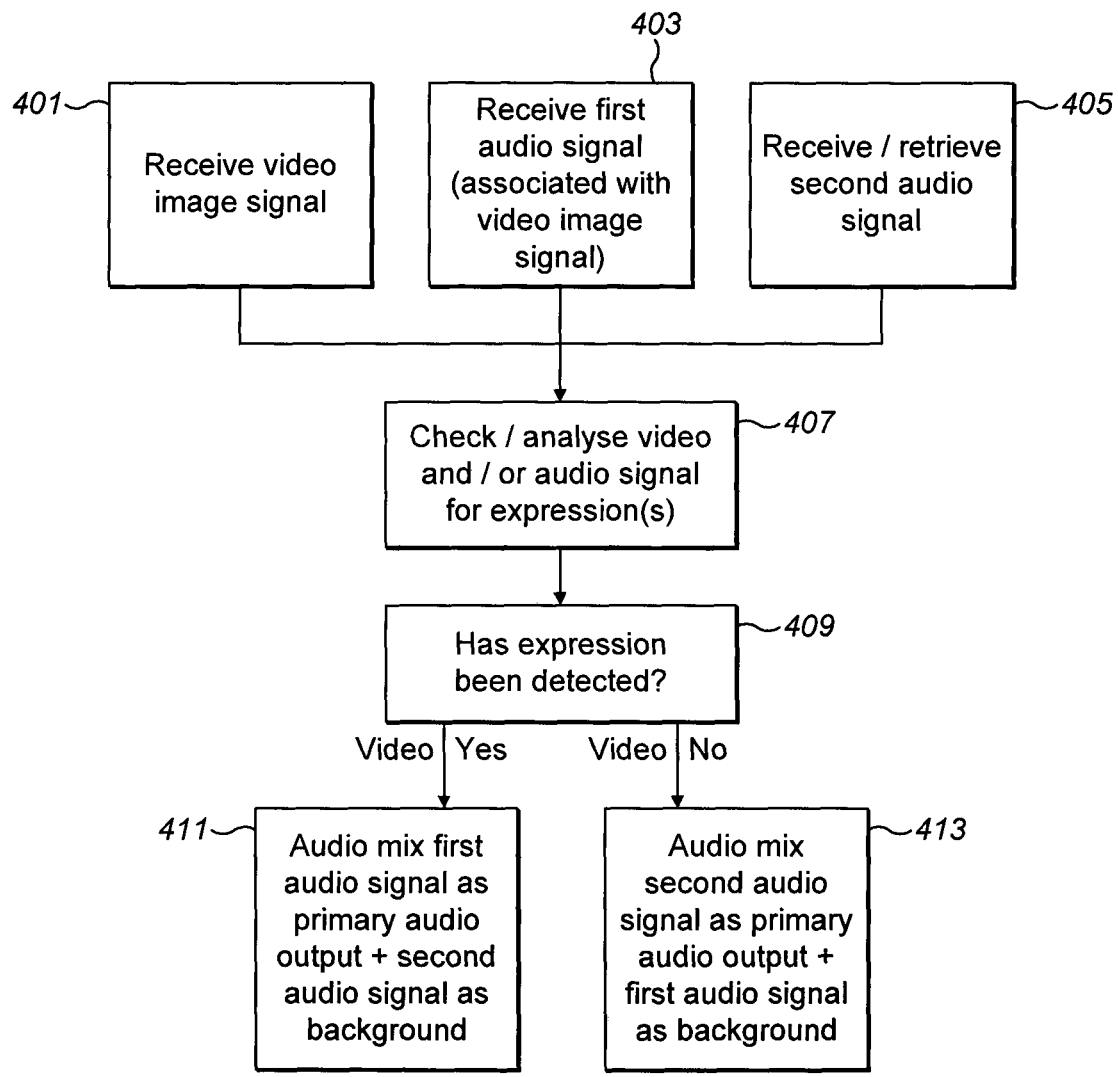
FIG. 7 shows schematically the operation of the expression controlled audio processing apparatus with respect to audio and audio-visual inputs as shown in FIG. 2 according to some embodiments.

With respect to FIG. 7 a further example of the operation of the processor apparatus such as shown in FIG. 2 is shown wherein at least one video image signal is input to be analysed. As described herein as well as audio signal analysis in some embodiments the analyser can be configured to analyse text/data signal inputs and/or image/video signal inputs which are associated with audio signals being processed. In such embodiments the examples described herein with respect to FIGS. 3 to 6 can be seen as simplified version of such embodiments.

In some embodiments therefore the image/video signal input A 103 is configured to receive a video image.

The receiving of a video image is shown in FIG. 7 by step 401.

Furthermore there is at least one first audio signal input which is associated with the video image signal. In some embodiments this information can be stored in memory and used by the analyser 111.

In some embodiments the processing apparatus comprises a first audio signal input; audio input 1 101, which is associated with the video/image signal input A 103. Furthermore the processing apparatus comprises a second audio signal input; audio input N $101_N$.

The receiving a first audio signal associated with the video image signal is shown in FIG. 7 by step 403.

The operation of receiving a second or further audio signal (not associated with the video image) is shown in FIG. 7 by step 405.

In some embodiments the analyser 111 comprises a video analyser 117 is configured to analyse the video signal for an expression (keyword or video/image fingerprint) or a specific expression (keyword or video/image fingerprint) pattern.

The operation of checking or analysing the video signal for the expression (keyword or fingerprint) is shown in FIG. 7 by step 407.

The analyser 111 and specifically the image/video analyser 117 can then be configured to detect whether the expression (keyword) has been detected with respect to the video image input. Where the video image has the expression (keyword) then the analyser 111 can be configured to control the mixer to mix the audio signal output such that the first audio signal (the audio input 1 $101_1$) is the primary audio output in other words to the foreground of the audio mix and the second audio signal (the audio input N $101_N$) is the background.

Where the expression (keyword) has not been detected in the video (or the first audio signal) then the analyser can be configured to control the mixer such that the audio mixer outputs the second audio signal as (audio signal N $101_N$) the primary audio output, in other words as the foreground audio signal, and the first audio signal (audio signal 1 $101_1$) as the background or secondary audio signal.

The operation of detecting whether the expression (keyword) has been detected in the video image is shown in step 409 of FIG. 7.

The operation of mixing the audio such that the first audio is the primary audio output and the second audio signal is the background is shown in FIG. 7 by step 411.

The operation of mixing the audio such that the second audio signal is the primary audio output and the first audio signal is the background is shown in FIG. 7 by step 413.

It shall be appreciated that the term user equipment is intended to cover any suitable type of wireless user equipment, such as mobile telephones, portable data processing devices or portable web browsers.

Furthermore elements of a public land mobile network (PLMN) may also comprise audio signal processing as described above.

In general, the various embodiments of the application may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the application may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Thus at least some embodiments may be an apparatus comprising at least one processor and at least one memory including computer program code the at least one memory and the computer program code configured to, with the at least one processor, cause the apparatus at least to perform: analysing at least one input to determine one or more expression within the at least one input; and controlling at least one audio signal associated with the at least one input dependent on the determination of the one or more expression.

The embodiments of this application may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions.

Thus at least some embodiments may be a computer-readable medium encoded with instructions that, when executed by a computer perform: analysing at least one input to determine one or more expression within the at least one input; and controlling at least one audio signal associated with the at least one input dependent on the determination of the one or more expression.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the application may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

As used in this application, the term 'circuitry' refers to all of the following:
(a) hardware-only circuit implementations (such as implementations in only analog and/or digital circuitry) and
(b) to combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone or server, to perform various functions and
(c) to circuits, such as a microprocessor(s) or a portion of a microprocessor(s), that require software or firmware for operation, even if the software or firmware is not physically present.

This definition of 'circuitry' applies to all uses of this term in this application, including any claims. As a further example, as used in this application, the term 'circuitry' would also cover an implementation of merely a processor (or multiple processors) or portion of a processor and its (or their) accompanying software and/or firmware. The term 'circuitry' would also cover, for example and if applicable to the particular claim element, a baseband integrated circuit or applications processor integrated circuit for a mobile phone or similar integrated circuit in server, a cellular network device, or other network device.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. A method comprising:

receiving, at a portable electronic device, at least one first audio signal input generated by at least one microphone of the portable electronic device, wherein the at least one first audio signal input is associated with a first source captured from a location surrounding the portable electronic device;

receiving at least one second audio signal at the portable electronic device, wherein the at least one second audio signal is associated with a second source, wherein the first source is different from the second source and the second source is associated with one of a plurality of audio or visual media sources being consumed by the portable electronic device at a same time the at least one first audio signal input is received;

analyzing the at least one first audio signal input to determine one or more expressions from a predefined expression set within the at least one first audio signal input;

generating a control signal to control, by a processor, the at least one second audio signal or the at least one first audio signal input in response to determination of the one or more expressions in the at least one first audio signal input, wherein controlling the at least one second audio signal or the at least one first audio signal input comprises volume processing at least one of the at least one first audio signal input and the at least one second audio signal dependent on the determination of the one or more expressions and spatial processing of at least one of the at least one first audio signal input and the at least one second audio signal for sound reproduction such that during sound reproduction of the first and second audio signals, at least one of the at least one first audio signal input and the at least one second audio signal is spatially located to the front or side or rear of a listener depending on the determined one or more expressions,
wherein spatial processing of at least one of the at least one first audio signal input and the at least one second audio signal dependent on the determination of the one or more expressions comprise:
generating at least one of an impulse response or a transfer function associated with at least one of the at least one first audio signal input and the at least one second audio signal, wherein the generated at least one of the impulse response and the transfer function is dependent on the determination of the one or more expressions; and
applying the generated at least one of the impulse response and the transfer function respectively to one of the at least one first audio signal input and the at least one second audio signal; and
outputting to an audio output the spatially processed at least one of the at least one first audio signal input and the at least one second audio signal.

2. The method as claimed in claim 1, further comprising controlling the at least one second audio signal by at least one of:
pausing the at least one second audio signal dependent on the determination of the one or more expressions;
closing the second source associated with the at least one second audio signal dependent on the determination of the one or more expressions; and
playing the at least one second audio signal dependent on the determination of the one or more expressions.

3. The method as claimed in claim 1, further comprising spatial processing to the front of the listener the at least one first audio signal input dependent on the determination of the one or more expressions.

4. The method as claimed in claim 1, further comprising spatial processing to the rear of the listener the at least one second audio signal dependent on the determination of the one or more expressions.

5. The method as claimed in claim 1, wherein when controlling the at least one second audio signal comprises volume processing the at least one first audio signal input dependent on the one or more expressions, the method further comprises volume processing to a foreground the at least one first audio signal input dependent on the determination of the one or more expressions.

6. The method as claimed in claim 5, further comprising volume processing to a background the at least one second audio signal dependent on the one or more expressions.

7. The method as claimed in claim 5, wherein volume processing the at least one first audio signal input dependent on the one or more expressions further comprises:
generating a volume level associated with the at least one first audio signal input wherein the volume level is dependent on the one or more expressions; and
applying the volume level to the at least one first audio signal input.

8. The method as claimed in claim 1, wherein determining whether one or more expressions is detected with respect to the at least one first audio signal input comprises
audio signal analyzing to determine the one or more expressions.

9. The method as claimed in claim 1, further comprising analyzing at least one input to determine the one or more expressions comprise at least one of:
hidden Markov model analyzing;
pattern detection analyzing;
dynamic time warping speech recognition analyzing;
neural network pattern recognition analyzing;
maximum entropy Markov model analyzing;
Bayesian network analyzing;
tonal analyzing; and
beat pattern analyzing.

10. The method as claimed in claim 1, further comprising at least one of: selecting the one or more expressions to be detected; or generating the one or more expressions to be detected.

11. The method as claimed in claim 10, wherein generating the one or more expressions comprise:
selecting the at least one first audio signal input;
selecting a portion of the at least one input; and
generating the one or more expressions dependent on the portion of the at least one input.

12. The method as claimed in claim 11, wherein the at least one input comprises:
an audio signal;
a text input;
a data input;
an image input; or
a video input.

13. The method as claimed in claim 11, further comprising receiving the at least one first audio signal input and the at least one second audio signal from:
a memory configured to store a pre-recorded or downloaded file;
a transceiver;
a receiver configured to receive a transmitted signal;
at least one microphone configured to generate a signal based on a sound field surrounding an apparatus; or
a sensor configured to generate a signal dependent on a characteristic of an apparatus.

14. The method as claimed in claim 1, wherein the one or more expressions comprise:
at least one phoneme;
a defined musical note sequence;
a defined image;
an image component defined movement;
a defined text expression;
a defined data expression;
a defined silence period;
a defined click;
a defined noise burst; or
a defined hand clap.

15. The method as claimed in claim 1, further comprising:
detecting whether the one or more expressions is detected with respect to the at least one second audio signal input.

16. The method as claimed in claim 1, wherein determining whether one or more expressions is detected with respect to the at least one first audio signal input comprises estimating phonemes within the at least one first audio signal input.

17. The method as claimed in claim 1, wherein the one or more expressions comprise rhythmic patterns associated with a theme or signature.

18. The method as claimed in claim 1, wherein the predefined expression set comprises audio and text expressions.

19. An apparatus comprising at least one processor and at least one memory including computer code for one or more programs, the at least one memory and the computer code configured to with the at least one processor cause the apparatus to at least:
- receive, at a portable electronic device, at least one first audio signal input generated by at least one microphone of the portable electronic device, wherein the at least one first audio signal input is associated with a first source captured from a location surrounding the portable electronic device;
- receive at least one second audio signal at the portable electronic device, wherein the at least one second audio signal is associated with a second source, wherein the first source is different from the second source and the second source is associated with one of a plurality of audio or visual media sources being consumed by the portable electronic device at a same time the at least one first audio signal input is received;
- analyze the at least one first audio signal input to determine one or more expressions from a predefined expression set within the at least one first audio signal input;
- generate a control signal to control the at least one second audio signal or the at least one first audio signal input in response to determination of the one or more expressions in the at least one first audio signal input, wherein to control the at least one second audio signal or the at least one first audio signal input comprises volume processing at least one of the at least one first audio signal input and the at least one second audio signal dependent on the determination of the one or more expressions and spatial processing of at least one of the at least one first audio signal input and the at least one second audio signal for sound reproduction such that during sound reproduction of the first and second audio signals, at least one of the at least one first audio signal input and the at least one second audio signal is spatially located to the front or side or rear of a listener depending on the determined one or more expressions,
- wherein spatial processing of at least one of the at least one first audio signal input and the at least one second audio signal dependent on the determination of the one or more expressions comprise:
  - generating at least one of an impulse response or a transfer function associated with at least one of the at least one first audio signal input and the at least one second audio signal, wherein the generated at least one of the impulse response and the transfer function is dependent on the determination of the one or more expressions; and
  - applying the generated at least one of the impulse response and the transfer function respectively to one of the at least one first audio signal input and the at least one second audio signa; and
  - output to an audio output the spatially processed at least one of the at least one first audio signal input and the at least one second audio signal.

20. The apparatus as claimed in claim 19, further comprising spatial processing to the front of the listener the at least one first audio signal input dependent on the determination of the one or more expressions.

21. The apparatus as claimed in claim 19, further comprising spatial processing the rear of the listener the at least one second audio signal dependent on the determination of the one or more expressions.

22. A computer program product comprising a non-transitory computer-readable medium having computer code stored thereon, the computer code, upon execution, causing:
- receiving, at a portable electronic device, at least one first audio signal input generated by at least one microphone of the portable electronic device, wherein the at least one first audio signal input is associated with a first source captured from a location surrounding the portable electronic device;
- receiving at least one second audio signal at the portable electronic device, wherein the at least one second audio signal is associated with a second source, wherein the first source is different from the second source and the second source is associated with one of a plurality of audio or visual media sources being consumed by the portable electronic device at a same time the at least one first audio signal input is received;
- analyzing the at least one first audio signal input to determine one or more expressions from a predefined expression set within the at least one first audio signal input;
- generating a control signal to control the at least one second audio signal or the at least one first audio signal input in response to determination of the one or more expressions in the at least one first audio signal input, wherein controlling of the at least one second audio signal or the at least one first audio signal input comprises volume processing at least one of the at least one first audio signal input and the at least one second audio signal dependent on the determination of the one or more expressions and spatial processing of at least one of the at least one first audio signal input and the at least one second audio signal for sound reproduction such that during sound reproduction of the first and second audio signals, at least one of the at least one first audio signal input and the at least one second audio signal is spatially located to the front or side or rear of a listener depending on the determined one or more expressions,
- wherein spatial processing of at least one of the at least one first audio signal input and the at least one second audio signal dependent on the determination of the one or more expressions comprise:
  - generating at least one of an impulse response or a transfer function associated with at least one of the at least one first audio signal input and the at least one second audio signal, wherein the generated at least one of the impulse response and the transfer function is dependent on the determination of the one or more expressions; and
  - applying the generated at least one of the impulse response and the transfer function respectively to one of the at least one first audio signal input and the at least one second audio signal; and
- outputting to an audio output the spatially processed at least one of the at least one first audio signal input and the at least one second audio signal.

* * * * *

UNITED STATES PATENT AND TRADEMARK OFFICE
CERTIFICATE OF CORRECTION

| | |
|---|---|
| PATENT NO. | : 11,089,405 B2 |
| APPLICATION NO. | : 14/383492 |
| DATED | : August 10, 2021 |
| INVENTOR(S) | : Jarvinen et al. |

It is certified that error appears in the above-identified patent and that said Letters Patent is hereby corrected as shown below:

In the Claims

Column 22,
Lines 55 and 56, Claim 15 "the at least one second audio signal input" should read --the at least one second audio signal--.

Signed and Sealed this
Twenty-eighth Day of June, 2022

Katherine Kelly Vidal
*Director of the United States Patent and Trademark Office*